Nov. 26, 1968 G. L. KING 3,413,556

FREQUENCY SHIFT RECEIVER PROVIDING THREE OUTPUT FUNCTIONS

Filed May 3, 1965 2 Sheets-Sheet 1

GEORGE L. KING
INVENTOR.

BY Rudolph J. Frank
ATTORNEY

GEORGE L. KING
INVENTOR

BY Rudolph J. Jurick
ATTORNEY 3,413,556

FREQUENCY SHIFT RECEIVER PROVIDING THREE OUTPUT FUNCTIONS

George L. King, Morris Plains, N.J., assignor to RFL Industries, Inc., Boonton, N.J., a corporation of New Jersey Filed May 3, 1965, Ser. No. 452,522
7 Claims. (Cl. 325—320)

ABSTRACT OF THE DISCLOSURE

A receiver providing a three state control function in correspondence with MARK, CENTER and SPACE input signals comprised of pulses having three different carrier frequencies. The receiver includes a discriminator comprising two tuned primary coils, individually coupled to secondary coils, and a squelch circuit which cuts off current flow through the primary coils when the amplitude of the input signals falls below a predetermined level. Output switch means are actuated between first and second positions in correspondence with received MARK and SPACE signals.

Figure 1:
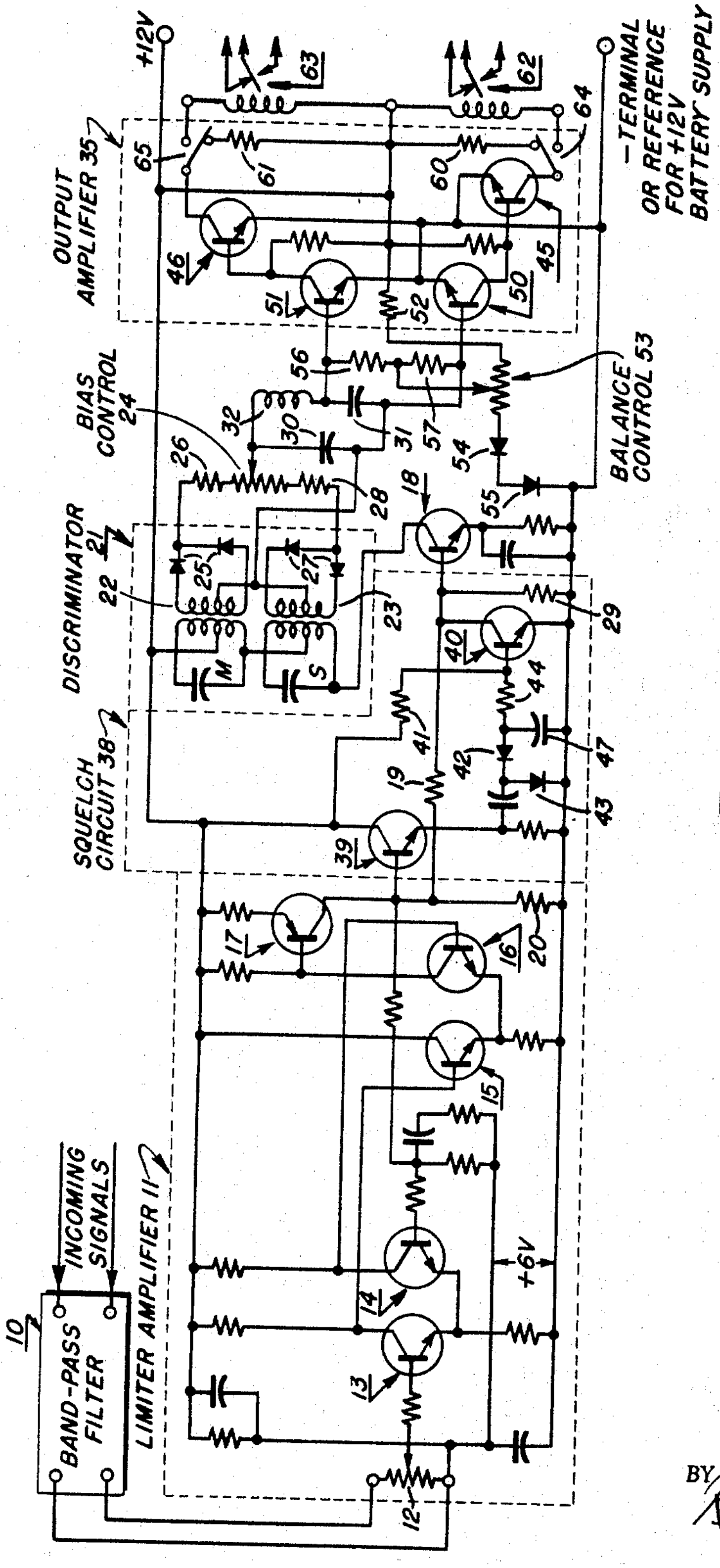

This invention relates to remote control or data transmission apparatus and more particularly to a frequency shift receiver apparatus adapted to be connected to a single carrier channel and responsive to three frequencies to provide three output functions.

In telegraph systems, signal pulses of two types ordinarily are utilized and it is common practice to designate one pulse a MARK signal and the other a SPACE signal. In frequency modulated systems, the MARK signals sent over a communication link may comprise, for example, a tone of one audio frequency while a SPACE signal comprises a tone of a second audio frequency. The signals may be generated by teleprinters which control the signal frequency output of the frequency shift transmitter, and the transmitter output is applied to a receiver over a desired communication link, such as telephone lines, microwave links, power line carrier systems, or the like. The MARK and SPACE signals are distinguished at the receiver and are effective to cause a desired operation of a teleprinter responsive to the receiver output.

For simple telemetering functions, the teleprinters may be eliminated from the system and suitable transducers may be included in place thereof, whereby such system may be used for the control or indication of a two position function. For example, any on-off function may be controlled or monitored from a remote position by letting the MARK signal represent the On function and the SPACE signal represent the Off function. If three functions are to be accommodated on a full FM basis by the use of such equipment, this can be accomplished with an additional transmitter, receiver and carrier channel. However, such operation also can be achieved by a single transmitter-receiver combination operating at three frequencies over a single carrier channel. Thus, for example, a Raise-Off-Lower function may be controlled or supervised by letting the MARK signal represent the Raise function, the SPACE signal represent the Lower function and the center frequency represent the Off function. The invention is directed to a three frequency receiver operating on a single carrier channel and providing a three position control function on a full FM basis. The three control functions are imposed on two output leads and a common lead, that is, there is a separately controllable on-off condition across each pair of leads. This also is useful for some code systems in data transmission.

An object of this invention is the provision of a receiver providing a three function output and operable on a full frequency shift basis in a single carrier channel.

An object of this invention is the provision of a telemetering receiving responsive to input signals of three frequencies and providing a corresponding three position control function.

An object of this invention is the provision of a frequency shift receiver providing three output functions in response to input signals of three frequencies, which receiver comprises a discriminator responsive to the received signals and producing D.C. output voltages in correspondence with the received signals, output circuits controlled by the discriminator output voltages, means controlling the response time of the output circuits and means squelching the signals applied to the discriminator when the received signals fall below a predetermined amplitude.

An object of this invention is the provision of a receiver responsive to three input signals having different frequencies, which receiver includes a tuned discriminator having a substantially straight line response characteristic over the range of frequencies of the input signals, means deriving two on-off outputs in response to received signals of the higher and lower frequencies, means for adjusting the outputs so that the on and off conditions occur for a selected portion of the output vs. frequency curve of the discriminator when the receiver is used for control purposes, and means for adjusting the relative on and off time periods of the said outputs when the receiver is used on a data transmission system.

These and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

Figure 2:
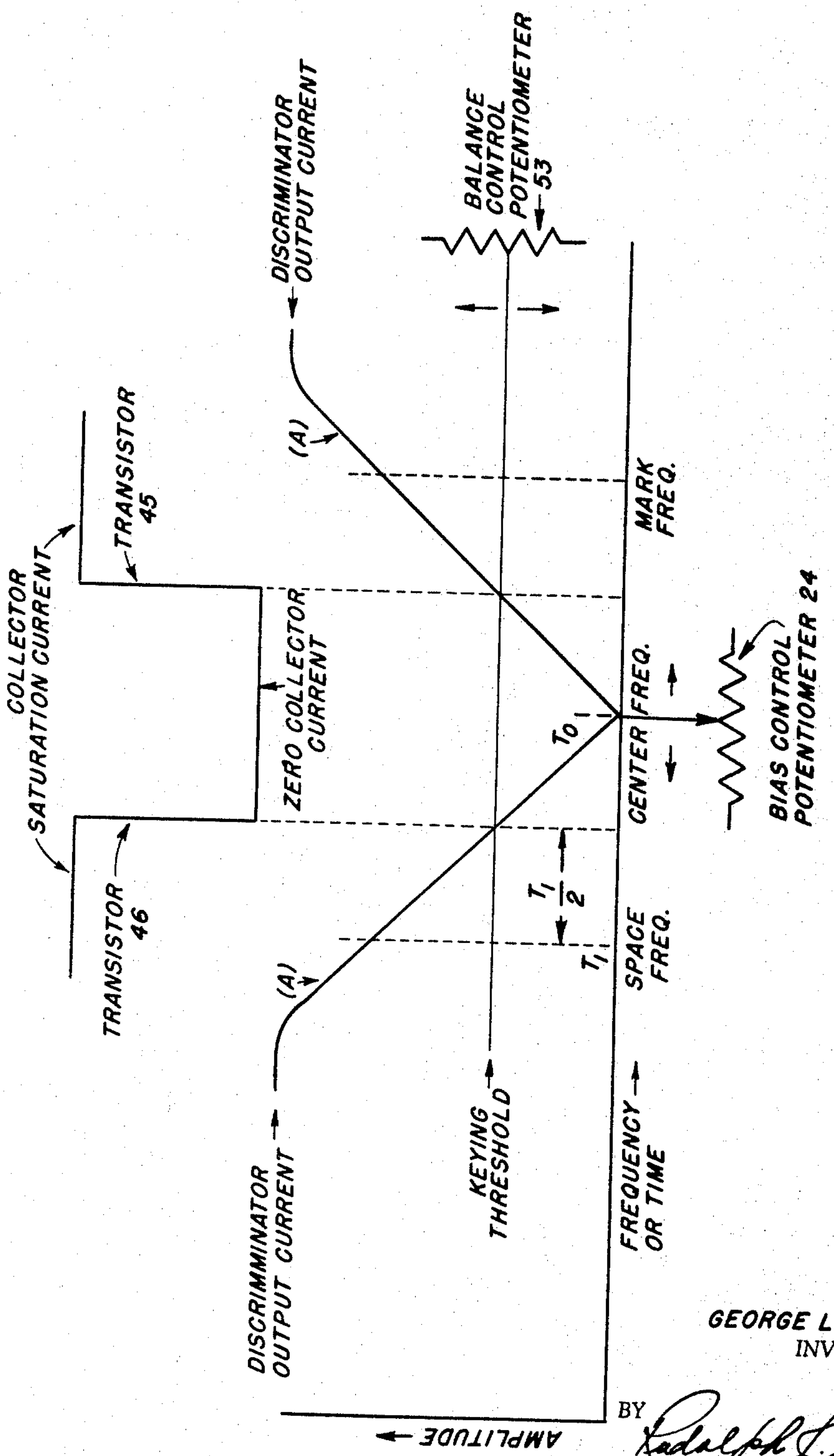

In the drawings:

FIGURE 1 is a schematic circuit diagram of a receiver made in accordance with this invention; and FIGURE 2 is a diagrammatic representation to show the effect of the apparatus bias and balance controls on the discriminator output.

Referring now to FIGURE 1, the incoming signals are applied to a pass band filter 10 having a band width corresponding to the similar filter in the output circuit of the remote transmitter. For purposes of illustration, it will be assumed that the transmitted signals have a center carrier frequency of 935 cycles per second, which frequency is shifted to 977.5 cycles per second for a MARK signal and to 882.5 cycles per second for a SPACE signal. After passing through the filter 10, the received signals are applied to a limiter amplifier 11 having a sensitivity control potentiometer 12.

The amplifier 11, having a high input impedance characteristic, is of conventional design comprising three direct coupled stages. The first stage comprises the emitter-coupled transistors 13 and 14 operating as a differential amplifier to provide a push-pull input to the second stage. The second stage includes a pair of emitter-coupled transistors 15 and 16 providing a single-ended input to the third stage consisting of the transistor 17. A feedback network from the collector of the transistor 17 to the inverting input of the first stages provides both D.C. and A.C. stability to the amplifier.

The output signal from the transistor 17 is coupled to the base of the transistor 18 by the resistors 19 and 29, which resistors also serve to provide the D.C. bias voltage for this transistor. With the amplifier 11 operating as a full limiting amplifier, the transistor 18 is switched on and off at the carrier frequency rate and the circuit is arranged to allow 40 milliampere peak pulses to energize the tuned discriminator 21, which discriminator is connected in the collector circuit of the transistor 18.

The discriminator consists of two parallel tuned circuits, the one circuit marked M being resonant at the MARK signal frequency of 977.5 cycles per second and the other circuit marked S being resonant at the SPACE signal frequency of 882.5 cycles per second. Output windings 22 and 23 are coupled, respectively, to the MARK and SPACE coils of the discriminator. The center taps on the output coils are connected together and to the series connected resistors 56 and 57. The ends of the output coil 22 are connected to a pair of rectifier diodes 25, which diodes are connected to one end of the potentiometer 24 through the resistor 26. Similarly, a pair of rectifier diodes 27 are connected to the ends of the output coil 23 and to the other end of the potentiometer 24 through the resistor 28. The diodes 27 are connected in reverse sense to the diodes 25. Thus, the voltages generated in the output coils 22 and 23 are fully rectified and the resulting D.C. voltages are applied in series-aiding relationship across the network comprising the series-connected resistors 26, 24 and 28. The described arrangement is a bridge circuit, with the D.C. output obtained between the movable arm of the bias control potentiometer 24 and the center connections of the output windings 22 and 23. The circuit parameters are so designed that when the discriminator is energized by MARK, CENTER and SPACE signals, the D.C. output voltages of the discriminator are (+) volts, (0) volts and (−) volts, respectively, with respect to the center taps of the output coils 22 and 23. It will be apparent that the discriminator output voltage also will be zero (0) in the absence of a carrier signal. The capacitors 30 and 31 and the choke coil 32 filter the carrier component from the discriminator output which is applied to the load resistors 56 and 57. These resistors serve as an input circuit to the D.C. output amplifier 35.

The squelch circuit 38 comprises the transistors 39 and 40 and associated circuit components. In the absence of a carrier signal, the transistor 40 is clamped by a forward bias through the resistor 41. This shunts the base of the transistor 18 which drives the discriminator. When signals from the amplifier 11 are applied to the rectifier diodes 42 and 43, through the emitter follower transistor 39, a reverse bias voltage is applied to the base of the transistor 40 through the resistor 44, thereby unclamping the transistor. The carrier signals from the transistor 17 then drive the transistor 18 to energize the discriminator. The circuit is designed so that the carrier signal must reach a predetermined level, preferably high enough to yield an undistorted signal from the D.C. output amplifier 35, before the transistor 18 is unclamped to permit the discriminator to drive the D.C. output amplifier 35. Hence, when the received carrier signal falls below such predetermined level, the discriminator is squelched and both of the transistors 45 and 46, in the last stage of the amplifier, are nonconducting. This threshold level is determined by the setting of the sensitivity control potentiometer 12 in the input circuit of the limiter amplifier 11. The value of the capacitor 47 determines the speed of operation of the squelching action. Thus, the turn-on time of the receivxer can be delayed to make the circuit less vulnerable to noise when the carrier signal falls below the predetermined level setting of the sensitivity control potentiometer 12. The band width, carrier frequency and the signal level of a given carrier channel, are also determining factors in the operating speed of the squelch circuit. As a typical example, in a 6,000 cycle channel having a band width of 1,200 cycles, the minimum turn-on and turn-off times of the squelching circuit each are of the order of 10 milliseconds. The turn-on time can be increased by increasing the value of the capacitor 47, the rate of increase being approximately 5 milliseconds for each microfarad of additional capacity.

The output amplifier 35 comprises two, separate amplifiers each consisting of two stages, specifically, the transistors 50 and 45 and the transistors 51 and 46. At a center frequency discriminator output (zero current), the transistors 50 and 51 are clamped in conducting states by the flow of base current from a voltage divider network through base-isolating resistors 56 and 57, the voltage divider network comprising the resistor 52, the potentiometer 53 and the diodes 54 and 55. Under this condition, both of the output transistors 45 and 46 are nonconducting. A MARK signal from the discriminator results in the injection of an increased clamping current flow in the base of the transistor 51, thereby maintaining the output transistor 46 in the nonconducting state. However, the increased discriminator output current, flowing through the base resistor 57, biases the transistor 50 to cutoff, thereby permitting the associated output transistor 45 to conduct. A SPACE signal current from the discriminator, being of opposite polarity, will reverse these conditions, that is, the output transistor 45 will be cut off and the output transistor 46 will conduct. The diodes 54 and 55 provide temperature compensation for the base-emitter junctions of the transistors 50 and 51.

Since the clamping current to the bases of the transistors 50 and 51 are derived from the common balance control potentiometer 53, the setting of this potentiometer will effect operations of both of the output transistors 45 and 46. When the potentiometer is adjusted to pass more current into the bases of transistors 51 and 50, a correspondingly greater output current is required from the discriminator in order to cut off the transistor 51 and 50 thereby to place the associated transistor 46 or 45 in the conducting state. This condition requires that MARK and SPACE frequencies must be shifted a greater extent, frequency-wise, from the carrier center frequency, before either of the output transistors 45, 46 will conduct. Also, the discriminator output will have a sloping characteristic as the frequency is shifted from the center frequency to either the MARK or SPACE frequency, due to the time constant of the filter network in the discriminator output circuit. Therefore, the setting of the balance control potentiometer 53 will determine the ratio of the on and off time periods of the output stages keyed at a given information rate. This ratio will be the same for both the MARK and SPACE output channels when the discriminator output is symmetrical with respect to frequency. Adjustment of the discriminator output to provide such symmetry is effected by means of the bias control potentiometer 24.

The effects of the balance control potentiometer 53 and the bias control potentiometer 24, upon circuit operation, are shown in the diagrammatic representation of FIGURE 2, wherein the discriminator output currents are represented by the curve A. It is pointed out, however, that the discriminator output currents are of opposite polarity for MARK and SPACE signals but they are here shown of the same polarity to indicate the effect of the balance and bias controls on the keying circuit. The keying threshold, as established by the setting of the balance control potentiometer 53, is indicated by the horizontal line terminating in the arrow representing the movable arm of the potentiometer. With the discriminator output symmetrical with respect to frequency, the two portions of the curve A will have the same slope. Assuming the current from the discriminator is shifted from the CENTER FREQUENCY LEVEL to the SPACE FREQUENCY LEVEL within the time period ($T_0$) to ($T_1$), it will be apparent that at time $T_1/2$, the discriminator output current reaches the threshold level. This results in the conduction of the SPACE channel output transistor 46 (see FIGURE 1). If, now, the keying threshold level is increased, by appropriate adjustment of the balance control potentiometer 53, more current is injected into the bases of the output amplifier transistors 50 and 51 (see FIGURE 1). Therefore, a correspondingly greater current is required from the discriminator to cut off the SPACE channel transistor 51 so that the associated output transistor 46 will conduct. The effect of such adjustment would be to change the on and off times of the transistor 46 for an output pulse train of complete reversals at a given repetitive rate. The operation of the output transistor 45, in the MARK channel, also is effected in like manner by such adjustment. Normally, zero bias is desirable, that is, on and off times of equal time duration, when the receiver is used to operate a data system code device.

In cases where the receiver outputs are to be used for on-off control purposes, the greatest operating reliability will be realized when the keying functions are geometrically symmetrical, as shown in FIGURE 2. It can be seen that this arrangement will permit the greatest carrier transmitter frequency drift or change in the discriminator tuning, before the channels fail to function as described.

The bias control potentiometer 24 serves to adjust the discriminator output relative to frequency, as shown in FIGURE 2. For example, assume that either the discriminator tuning or the transmitter frequency shifts after a given bias setting has been made by means of the potentiometer 24. This causes the bias at the receiver output stages to change in opposite directions in the MARK or SPACE channel. It can be seen that appropriate adjustment of the bias control potentiometer will shift the discriminator output current curve to the left or the right, thereby correcting the bias of both channels simultaneously.

Referring again to FIGURE 1, a MARK channel relay 62 will have its operating coil connected in place of the load resistor 60 of the normally nonconducting output transistor 4 by operation of the switch 64, and a similar SPACE channel relay 63 will have its operating coil connected in place of the load resistor 61 of the normally, nonconducting, output transistor 46, by operation of the switch 65. When one or the other of these transistors is switched, or keyed, to the conducting state, the corresponding relay is energized. Thus, when a CENTER frequency signal is received, or in the absence of any signal, both tof the relays are deenergized. Upon the receipt of a MARK signal, the relay 62 is energized while the relay 63 remains deenergized, whereas upon the receipt of a SPACE signal, the relay 63 is energized while the relay 62 remains deenergized. Thus, the contacts of the relays can be connected to an external circuit to provide RAISE, OFF and LOWER control functions in respnose to received MARK, CENTER and SPACE signals, respectively. Frequency shift channels are vulnerable to noise when no signal is transmitted. By providing an OFF control function at the CENTER frequency, maximum protection is provided against spurious operation of the MARK and SPACE relays by noise. This is for the condition wherein the noise frequency spectrum has a distribution approximately equal across the channel bandwidth. Equal amounts of MARK and SPACE frequency energy would tend to yield a zero output from the discriminator and cause both relays 62 and 63 to remain in the off condition if the carrier signal failed. This safety feature is valuable if the above-described squelch circuit is not supplied with the receiver. Devices other than the illustrated output relays can be connected to the output circuits of the receiver for three position operation.

Having described the invention, those skilled in this art will be able to make various changes and modifications without thereby departing from the scope and spirit of the invention as recited in the following claims.

I claim:

1. Apparatus responsive to input signals having three different frequencies, comprising:

(a) an amplifier receiving the input signals and having an output circuit, (b) a discriminator connected to the amplifier output circuit, said discriminator comprising a first primary coil tuned to resonance at the lowest frequency input signal, a second primary coil tuned to resonance at the highest frequency input signal, and first and second secondary coils respectively coupled to the first and second primary coils, (c) means rectifying the voltages generated in the said secondary coils to produce corresponding first and second D.C. voltages, (d) a pair of series connected resistors, (e) means applying the said D.C. output voltages in series-aiding relation across the said pair of resistors, (f) manually-adjustable control means for simultaneously adjusting the magnitudes of the D.C. output voltages, (g) a pair of switch means each actuable between first and second positions, (h) circuit elements connecting one of said switch means across one of said pair of resistors and the other switch means across the other one of said pair of resistors, (i) voltage-biasing means maintaing both switch means in the first positions when the voltage across the associated one of said resistors is less than a predetermined magnitude, (j) a transistor having an input circuit connected to the amplifier output circuit and an output circuit which includes both of the discriminator primary coils, and (k) means normally clamping the said transistor to the nonconducting state when the amplitude of the input signals is below a predetermined level.

2. The invention as recited in claim 1, including second manually-adjustable control means for adjusting the magnitude of the said voltage-biasing means.

3. The invention as recited in claim 1, including a pair of relays each having an operating coil operatively associated with one of the switch means, and means energizing a relay operating coil only when the associated switch means is actuated to the second position.

4. Apparatus for providing a three state control function in correspondence with MARK, CENTER and SPACE input signals comprised of pulses having different carrier frequencies, the center carrier frequency corresponding to the CENTER signal, said apparatus comprising:

(a) a limiter amplifier receiving the input signals and having an output circuit, (b) a discriminator comprising first and second primary coils connected to the amplifier output circuit, the first primary coil tuned to resonance at the MARK signal frequency and the second primary coil tuned to resonance at the SPACE signal frequency; first and second center-taped secondary coils coupled to the first and second primary coils, respectively, (c) a first set of rectifier diodes connected in the same sense to the ends of the said first secondary coil, (d) a second set of rectifier diodes connected to the ends of the said second secondary coil and in a sense opposite to that of the first set of diodes, (e) a low pass filter tuned to reject the carrier frequencies, (f) a first potentiometer connected to the two sets of diodes and having a movable arm, (g) first and second fixed resistors connected in series, an end of the second resistor being connected to the center taps of both said secondary coils and an end of the first resistor being connected to the movable arm of the said first potentiometer through the said low pass filter, (h) a second potentiometer connected across a source of D.C. voltage and having a movable arm connected to the junction of the said first and second fixed resistors, (i) a first transistor having input electrodes connected across the said first fixed resistor and one end of the said second potentiometer, and (j) a second transistor having input electrodes connected across the said second fixed resistor and the same end of the said second potentiometer, the recited arrangement being such that adjustment of the movable arm of the first potentiometer adjusts the relative magnitude of the filtered MARK and SPACE signals appearing across the said first and second resistors, and adjustment of the movable arm of the second potentiometer places both of the said transistors in either the conducting or non-conducting state when a zero signal or a CENTER signal is received, and only one or the other of the transistors is in the conducting state when a MARK signal is received.

5. The invention as recited in claim 4, including first and second relays each having an operating coil, circuit elements connecting the operating coil of the first relay in the output circuit of said first transistor, and circuit elements connecting the operating coil of the second relay in the output circuit of said second transistor.

6. The invention as recited in claim 4, including a third transistor; circuit elements connecting the discriminator primary coils in the output circuit of the third transistor; a third set of rectifier diodes; circuit elements connecting the input circuit of the third transistor to the amplifier output circuit through said third set of diodes thereby to provide a D.C. control voltage; and means biasing the third transistor to the nonconducting state when the control voltage is below a predetermined magnitude.

7. The invention as recited in claim 4, including a third transistor normally biased to the nonconducting state and having the discriminator primary coils connected in its output circuit; a fourth transistor having its output circuit connected to the input circuit of the third transistor said fourth transistor being normally clamped by a forward bias voltage thereby shunting the input circuit of the third transistor; a fifth transistor having an input circuit connected to the amplifier output circuit; a pair of diodes connected in series across the input circuit of the said fourth transistor; and a lead connected between the common junction of said pair of diodes and the emitter of said fifth transistor; the said pair of diodes and the fourth and fifth transistors constituting a squelch circuit to prevent conduction of the said third transistor until the amplitude of the signal applied across the input circuit of said fifth transistor exceeds a predetermined magnitude.

References Cited

UNITED STATES PATENTS

| | | | |
|---|---|---|---|
| 3,223,929 | 12/1965 | Hofstad et al. | |
| 3,260,942 | 7/1966 | Gilman | 325—349 |

ROBERT L. GRIFFIN, *Primary Examiner.*

W. S. FROMMER, *Assistant Examiner.*